(12) United States Patent
Griffith (10) Patent No.: US 10,464,606 B2
(45) Date of Patent: Nov. 5, 2019

(54) METHOD AND APPARATUS FOR GUIDING A VEHICLE ALONG A DEFINED GUIDEPATH

(71) Applicant: Robert E. Griffith, Naples, FL (US)

(72) Inventor: Robert E. Griffith, Naples, FL (US)

( * ) Notice: Subject to any disclaimer, the term of this patent is extended or adjusted under 35 U.S.C. 154(b) by 0 days.

(21) Appl. No.: 15/477,491

(22) Filed: Apr. 3, 2017

(65) Prior Publication Data

US 2018/0281858 A1 Oct. 4, 2018

(51) Int. Cl.
*B62D 15/02* (2006.01)
*G05D 1/02* (2006.01)
*B60W 30/06* (2006.01)

(52) U.S. Cl.
CPC ......... *B62D 15/0285* (2013.01); *B60W 30/06* (2013.01); *B62D 15/028* (2013.01); *B62D 15/0275* (2013.01); *G05D 1/0234* (2013.01); *G05D 1/0246* (2013.01)

(58) Field of Classification Search
None
See application file for complete search history.

(56) References Cited

U.S. PATENT DOCUMENTS

| | | | | |
|---|---|---|---|---|
| 2007/0150097 A1* | 6/2007 | Chae | ............... | G05D 1/0234 700/245 |
| 2010/0089677 A1* | 4/2010 | Tanaka | ............... | B62D 15/027 180/204 |
| 2016/0216128 A1* | 7/2016 | Takano | ............... | B60R 1/00 |
| 2016/0309974 A1* | 10/2016 | Abe | ............... | A47L 9/28 |
| 2017/0021767 A1* | 1/2017 | Lu | ............... | B62D 15/027 15/27 |
| 2018/0162446 A1* | 6/2018 | Mikuriya | ............... | B60R 21/00 |

* cited by examiner

*Primary Examiner* — Lail A Kleinman
(74) *Attorney, Agent, or Firm* — Vitale, Vickrey, Niro & Gasey LLP

(57) ABSTRACT

The present disclosure relates to a guide path for guiding a vehicle along a predetermined path to a precise parking position. Disclosed herein is a guide path which can be mounted on a garage wall, and a housing including a laser which may be mounted on a vehicle and used to target the guide path while parking. Also disclosed are embodiments where the guide path is mounted on a vehicle, and a laser is mounted on the garage wall. Further disclosed are embodiments in which the vehicle includes a video camera for capturing a target fixed to a garage wall, and a microprocessor which overlays a virtual guide path. Further disclosure relates to a microprocessor configured to recognize the vehicle's position relative to the target fixed to a garage wall, via a camera feed, and for automatically guiding the vehicle along the path to the parking position.

7 Claims, 8 Drawing Sheets

METHOD AND APPARATUS FOR GUIDING A VEHICLE ALONG A DEFINED GUIDEPATH

FIELD OF THE INVENTION

The present inventions relate to methods and apparatus for identifying the precise, best parking position for a vehicle in a limited enclosure, considering both horizontal as well as vertical measurements, and then providing a safe, exact route, sometimes referred to as a GuidePath, to target. The inventions provide visual feedback of the changing position of an advancing vehicle relative to the defined GuidePath and Target that allows a driver to, incrementally, adjust direction and speed to lock onto the defined GuidePath and Target in real time. Subsequently, the invention provides a safe, easy pathway, i.e. GuidePath from the parking position (Target) to the outside with real time, incremental adjustment capability for course correction. Further embodiments of the invention provide a video camera and a microprocessor, where said microprocessor made identify a target an automatically guide a vehicle along the path to the target.

DESCRIPTION OF THE PRIOR ART

It is frequently necessary to precisely park a vehicle in a parking spot, for example, in a residential garage where space is usually so limited that optimizing allocation of space becomes a priority. There are a number of available devices that seek to help park in a precise location, but no existing device offers the advantages of the present invention. For example, U.S. Pat. No. 6,040,787, to Durham, discloses a device having two lasers that can mount to a vehicle's visor. Durham discloses that the lasers may be angled towards each other, such that the two laser beams "converge" on a target once the vehicle reaches a predetermined distance from the desired parking position. While Durham discloses a method for parking a predetermined distance (i.e., vertically) from a target, Durham does not provide any disclosure of how to achieve a precise lateral parking position. Moreover, Durham fails to disclose any method or apparatus for guiding a vehicle towards said precise parking location. And, in no way, has Durham identified any means for exiting the garage.

In another example, U.S. Pat. No. 5,285,205 to White discloses a laser mounted in the back of a garage, the laser shining on a target on the vehicle's hood or windshield once the vehicle arrives at a predetermined parking position. However, White has multiple short comings. For example, the disclosed laser points at the vehicle, and thus the driver (without any shielding), while the driver is parking, thereby risking visual impairment to the driver. Moreover, White discloses only that a precise parking location is reached when the laser hits a target on the vehicle, but does not disclose any features for helping guide the vehicle to the parking location beginning outside of the garage. Nor does White address the problem of how a driver may exit the garage.

Accordingly, it would be a major advancement to have a system that can identify a precise position in the garage, considering both horizontal as well as vertical placement that could be returned to repeatedly, without error. Moreover, there is a need for a system that creates safe and convenient walking lanes for garage entry and exiting for the driver and passengers (and can be used to do the same for a second vehicle). Furthermore, there is a need for a system that allows car doors to be easily opened without damaging the side walls or adjacent vehicle, minimizes risk of the vehicle striking the garage rear wall, eliminates risk of garage door falling on the vehicle's bumper and/or trunk, provides maximum space utility, and which equips the driver, beginning at the outside garage entry door, with a graphic, specific route (i.e., a defined GuidePath) that will lead directly to the precise parking location (Target). There is a further need for a system which can graphically and/or visually show a driver the vehicle's position relative to the defined Guidepath and Target. Further yet, there is a need for a system which equips drivers with an exit, graphic defined GuidePath to guide drivers from the precise parking place to the out of doors, and provides the driver with the ability to, incrementally, fine tune the vehicle's position in real time along the route to remain within the Target and defined Guideline established limits.

BRIEF SUMMARY OF THE INVENTIONS

Embodiments of the presently claimed and disclosed inventions overcome deficiencies of known parking systems and also provide new features and advantages. For example, embodiments of the inventions show the driver the Target that identifies and projects the exact location of the precisely defined, best parking space, both horizontally and vertically.

The GuidePath is appended to the Target, showing the exact route for the vehicle to follow in traveling to and from the garage entryway to the precise parking location. And then, the system may show the driver the vehicle's exact, moving and instantaneous position, relative to the Target and the GuidePath, allowing the driver to, incrementally, fine tune his steering to keep the vehicle in line with the defined path and on course to the Target.

Some embodiments may include a laser mountable inside a vehicle or on the garage wall, which may be activated as the vehicle approaches a parking spot and which identifies the vehicle's position relative to the GuidePath and Target. Further yet, some embodiments may include a vehicle-installed, forward facing camera and visual display, which displays a virtual GuidePath superimposed over the camera feed, where the camera feed captures the vehicle's changing position by tracking a fixed marker, usually placed upon the back wall. Together, the visual display of the virtual Guidepath-Target overlay and the moving position of a fixed image, provide an accurate representation of the vehicle's position relative to the pathway and precise parking position.

Embodiments of the invention can be employed by OEM manufacturers to produce a driverless parking system. In additional embodiments, the visual display is displaced with virtual software and the fixed Target need not be in the visible spectrum but, for example, infrared. In non-limiting exemplary embodiments, a vehicle may employ technology including Lane Keep Assist Systems (LKAS), and similar technologies, to supply torque to the steering system to steer the vehicle towards the defined Guidepath and then to lock on to it. Embodiments of the invention include guiding the vehicle to its parking position, and then stopping at a predetermined proximity from a wall.

In summary, it is an object of present inventions to provide a parking system that will identify a precise and preferred parking location, measured both horizontally and vertically, that also provides a safe, defined route from the garage entry to that location and out again.

It is a complementary object of present inventions to provide the driver with visual feedback of the above, showing vehicle's position relative to a predetermined parking location and the defined path to that location.

Also, an embodiment of this parking system will provide driver with the capability to, incrementally, alter the vehicle's direction and speed in real time, from garage entry point to the precise parking location by following the safe, assured Guidepath.

Further, an object of present inventions is to provide a parking system that will maximize safety and minimize driver concerns and involvement.

Lastly, it is an object of present inventions to provide a parking system that can be easily installed in vehicles, including installation by an OEM.

DETAILED DESCRIPTION OF THE PREFERRED EMBODIMENTS

Set forth below is a description of what is currently believed to be the preferred embodiment(s) or best representative example(s) of the inventions claimed. Future and present representations and/or modifications to the embodiments are contemplated. Any alterations or modifications which make insubstantial changes in function, purpose, structure or result are intended to be covered by the claims of this patent.

Figure 1:
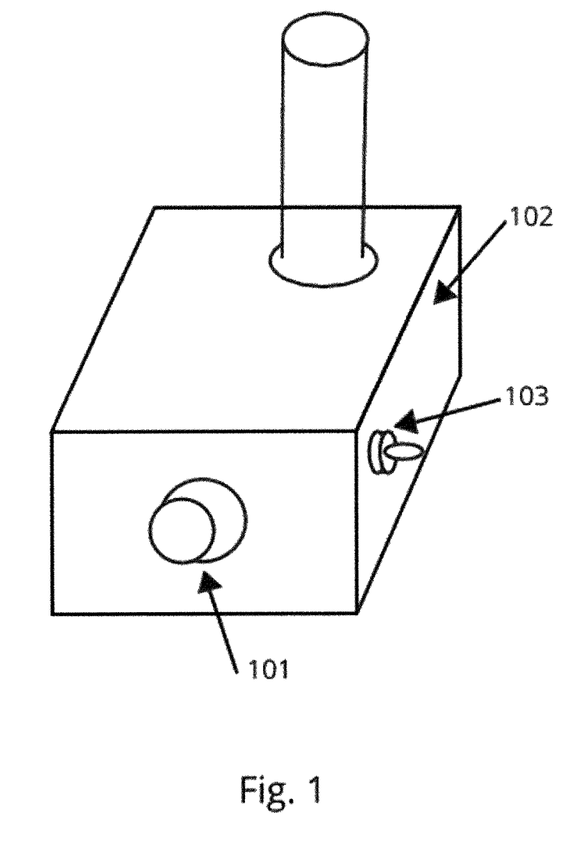
FIG. 1 shows a front view of an embodiment of the invention
Figure 2:
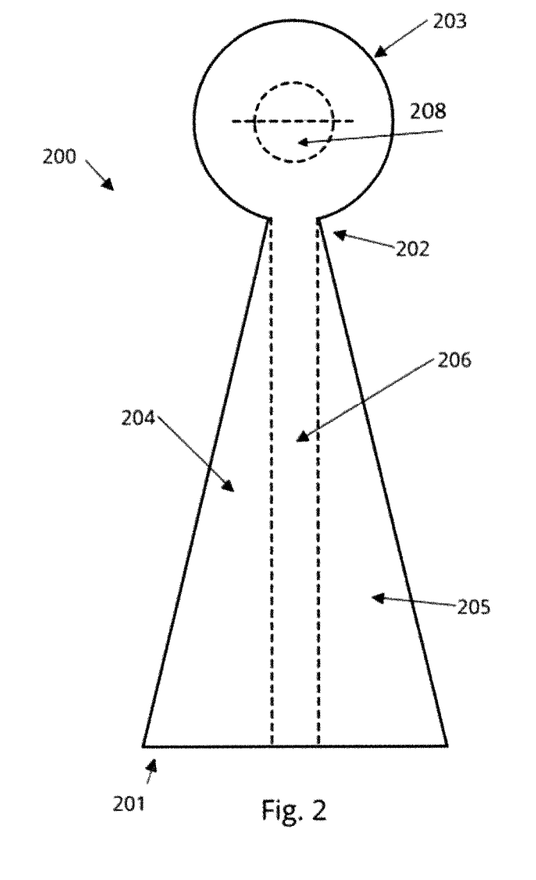
FIG. 2 shows an exemplary view of a GuidePath disclosed herein.

As seen in exemplary FIG. 1, some embodiments of the present inventions generally include a laser 101, which may be mounted in a housing 102 or otherwise embedded in a vehicle. It is intended that the laser 101 and housing 102 may be embedded in any type of vehicle. The laser 101 may be used to target a guide path 200, an example of which is seen in FIG. 2. The GuidePath 200 may be affixed to a garage's back wall to provide visual feedback to a driver approaching a parking spot. In positioning the GuidePath 200, the vehicle is placed in its preferred parking location so that laser 101 beam strikes the Target 208 of GuidePath 200 as shown in FIG. 2. Throughout this disclosure, examples of passenger vehicles and residential garages are discussed, but the disclosure is not intended to be limited to these examples. Instead, the inventions disclosed herein may be used in any vehicle desiring to move to a precise position.

In some embodiments of the inventions, laser 101 may be mounted in a small housing 102, having exemplary dimensions of 65 mm×35 mm×35 mm. Preferably, laser 101 is a Class 2 or Class 3a laser, as they are particularly suited for the use disclosed herein. The housing 102 may further contain a battery and a battery holder, a pushbutton 103 for activating the laser, a printed circuit board, and a mount for affixing the housing to the inside of a vehicle. For example, the mount may be a suction cup for attaching to the windshield, a clip for attaching to the visor, Velcro, or any other fastener.

In other embodiments, laser 101 may be installed in a vehicle by an OEM (original equipment manufacturer)—for example, by embedding it near the vehicle's windshield or in front of the vehicle. In such embodiments, the pushbutton 103 for activating the laser may be included in the vehicle's dashboard, door or on a steering wheel control. Regardless of where pushbutton 103 is mounted, it is contemplated that activating pushbutton 103 may activate laser 101 for a predetermined time—for example, approximately 35 seconds. In this way, a driver only needs to activate pushbutton 103 once, and laser 101 remains active for the duration until the driver has reached a desired parking position. In other embodiments, pushbutton 103 is omitted and laser 101 may be activated by light, sonic sensors or voice, remote control, garage door openers, or automatic devices.

In GuidePath 200, FIG. 2, the Target Center, i.e. Target 208, is the graphical representation of the preferred parking location (horizontally and vertically), relative to the garage area. GuidePath 200 includes a vertical component 206, straight up or straight down, that represents the defined route between the preferred parking location and the garage entry.

Figure 3:
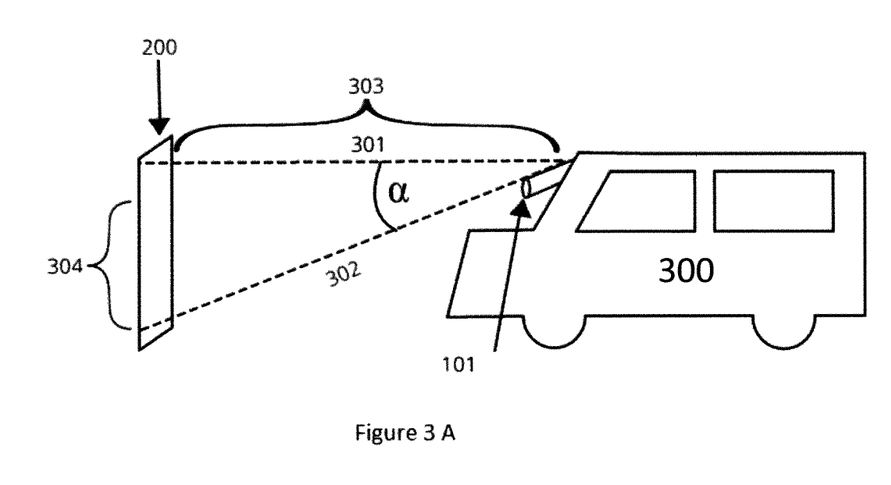
FIG. 3A shows an exemplary view of a vehicle using an embodiment of the inventions approaching a garage wall with vehicle-installed laser and garage-installed GuidePath
FIG. 3B is a top-down view of a vehicle using an embodiment of the inventions approaching a garage wall
FIG. 3C shows an embodiment of the inventions with vehicle installed GuidePath and garage installed Laser.
Figure 3B:
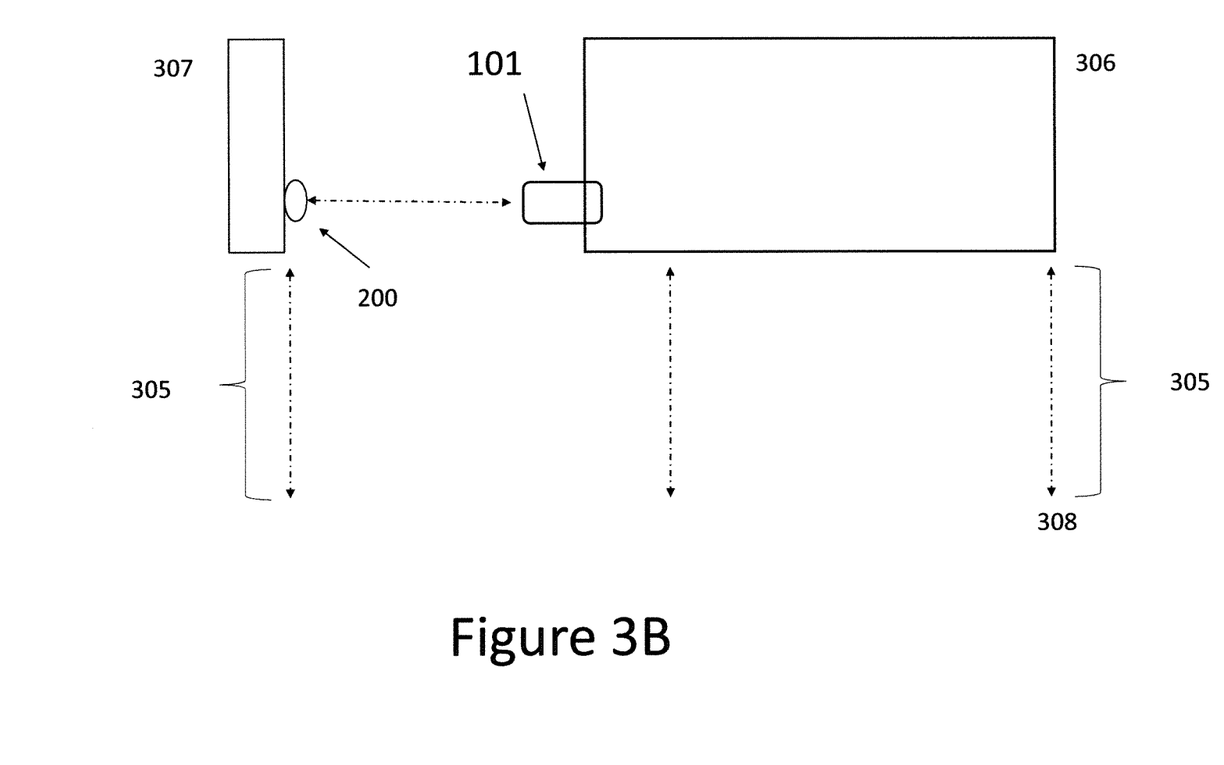

As seen in FIG. 3A, laser 101 is mounted parallel to the horizontal plane and to have a slight angle α away from the vehicle's horizontal plane 301. By way of non-limiting example, laser 101 may be angled between 2 degrees and 10 degrees downward from the vehicle's horizontal plane 301. Pointing laser 101 slightly downward along plane 302 causes the laser to rise up the GuidePath 200 as the distance 303 between the vehicle and the GuidePath 200 decreases. In other words, as the distance 303 between the vehicle 300 and GuidePath 200 decreases, the height 304 of the laser beam increases. Similarly, laser 101 can be configured with an angle α pointing upwards from the horizontal plane 301, in which scenario the laser beam travels downward on the GuidePath as height 304 decreases. FIG. 3B shows a top-down view of a vehicle 306 approaching a wall 307 on which GuidePath 200 is mounted. It also shows laser 101 and GuidePath 200's vertical component 206 installed at the same horizontal distance 309 from the wall. The vehicle is approaching with laser 101 aimed at GuidePath 200, and specifically the vertical component 206. Distance 305, between the vehicle 306 and the side wall 308, is equal throughout the vehicle's 306 path. With the driver making slight steering adjustments to keep the laser beam on 206, the closing distance will move the laser beam up until it reaches the Target 208, at which moment, the vehicle will arrive at the precise vertical and horizontal position identified as the best parking location.

As a driver approaches a parking spot, laser 101, in an embodiment where laser 101 has a downward angle, will strike the lower base 201 of GuidePath 200 as the vehicle first approaches the parking spot (for example, from just outside a garage). In one embodiment, seen in FIG. 2, GuidePath 200 has a relatively wider lower base 201 which narrows towards the top 202, and a circular (or other shape) Target 208 may be configured at the top of GuidePath 200. Moreover, the GuidePath 200 may be divided into a left boundary 204, right boundary 205, and vertical component 206. These sections provide visual feedback to a driver, indicative of the driver's approach to the parking spot. The sections of GuidePath 200 indicate the path a driver should take to arrive at the predetermined parking position: to arrive at the most precise parking position, a driver should steer the vehicle to move the laser beam towards the vertical component 206 and advance the vehicle until the laser beam strikes the guide path's Target 208. In other words, the driver keeps the beam pointed at the vertical component while the beam "rises" up the GuidePath 200 as the driver gets closer. Once the beam hits the guide path's Target 208, the vehicle is precisely in the predetermined parking position—both horizontally and vertically.

In some embodiments of the inventions, the left and right boundaries 204 and 205 of the GuidePath 200 and the field of 203 may be colored in blue, black or other less reflective color, whereas the vertical component 206 and center of Target 208 may be colored in yellow, white or other highly reflective colors. Blue provides a softer reflection of the laser beam relative to yellow. As a vehicle approaches GuidePath 200 and the laser beam slides from a blue section to a yellow section, the beam appears to "pop," or jump out at the driver, because the reflection off the yellow section is stronger than the reflection off the blue section. In yet further embodiments, various sections of the GuidePath 200 may be made up of any combination of reflective and/or non-reflective materials, including woods, metals, plastics, etc.

Figure 3C:
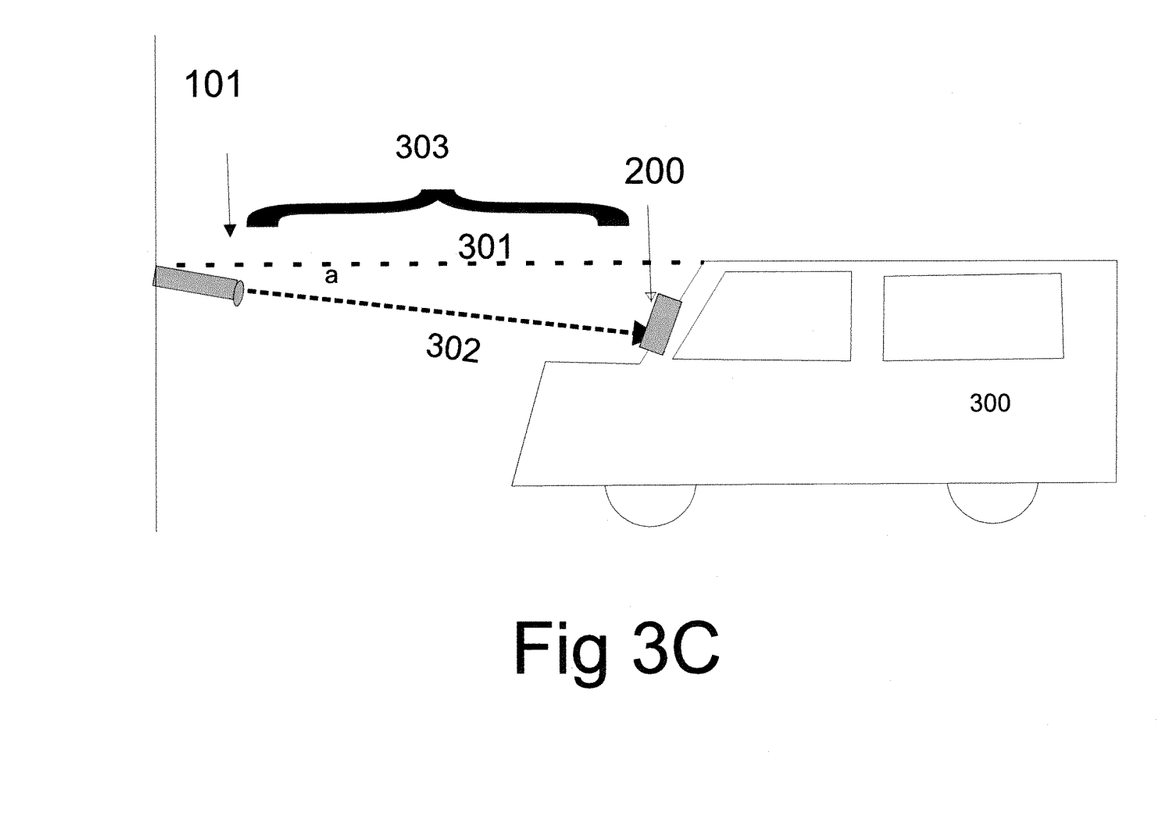

In an embodiment shown in FIG. 3C, laser 101 and the GuidePath 200 may reverse their positions wherein the GuidePath 200 appears on the wind shield and the laser is installed on the far wall or ceiling as seen in FIG. 3C. Both the Guidepath 200 and the laser 101 are positioned on the wind shield and garage wall, respectively, at the same horizontal distance from the wall. With the vehicle prepositioned in its best parking spot, the laser is aimed down a few degrees, as demonstrated in FIG. 3C, and affixed to the garage wall where the laser beams onto the Target 208 of the GuidePath 200. All other characteristics and performance identified in the embodiments above remain valid in this application. The physical appearance of the GuidePath 200 may be more abbreviated to limit visually distractions but it is contemplated that it will have a Target at one end and a vertical component appended to the Target to graphically display the defined pathway and progress of the vehicle into and out of the garage. The laser 101 may be housed in a small housing. It may include an energy source from ac or dc cells and actuated by garage door opener, light sensor, sonic sensor, voice sensor, motion sensor or remote control.

Figure 4:
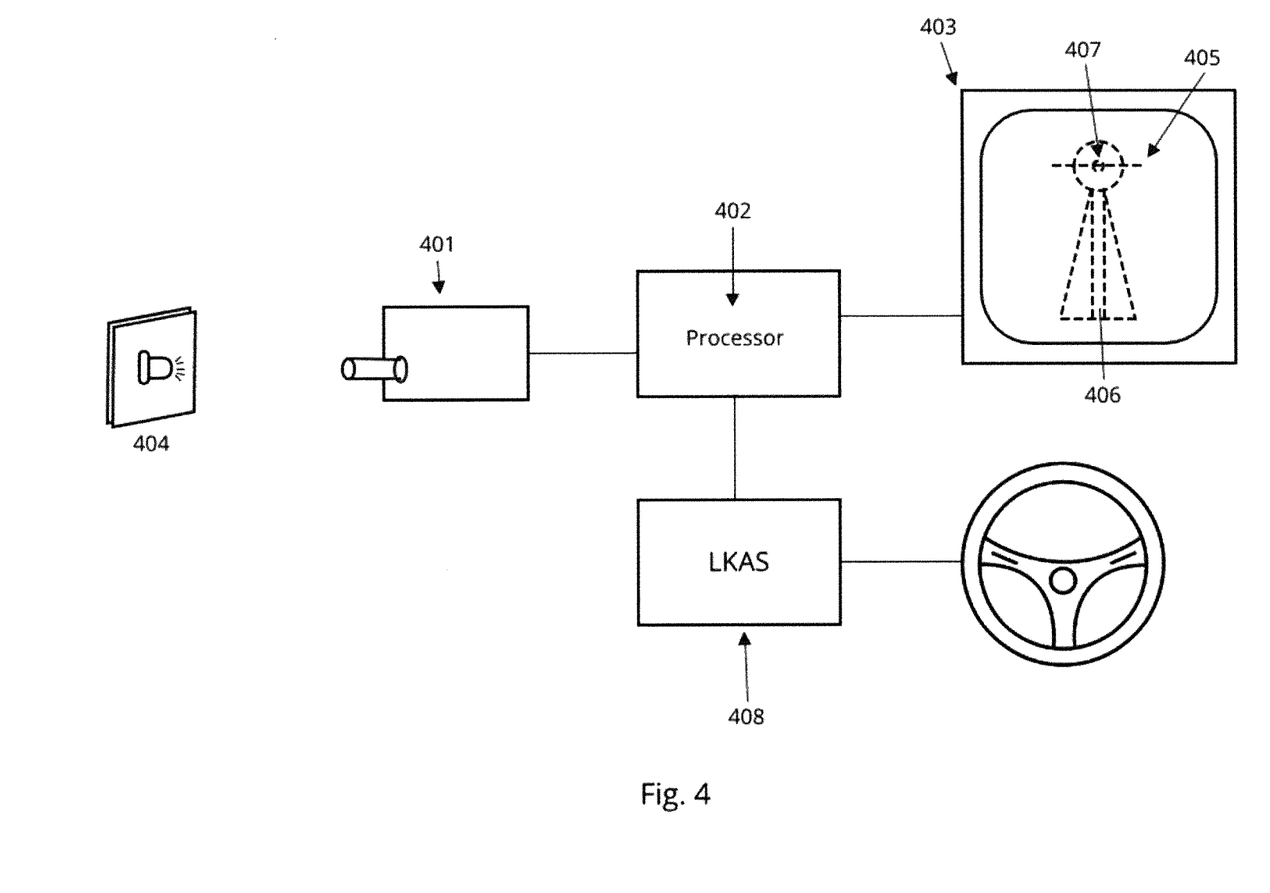
FIG. 4 is a schematic showing an exemplary video camera connected to a processor, a display, an LKAS system (or similar technology) and steering wheel according to embodiments of the inventions.

Some embodiments of the present inventions may replace the laser 101 with a camera 401, as seen for example in FIG. 4. Some vehicles may already have a forward facing camera installed, thereby eliminating the need to install additional components. In such embodiments, seen in exemplary FIG. 4, camera 401 may be connected to a processor 402, which displays a virtual GuidePath superimposed over the camera feed which in turn may be connected to a video display 403 mounted inside the vehicle, for example, on the dashboard or "heads up" display. In another embodiment, a free standing camera, including processor and video display may be installed, most frequently in the windshield area.

Preferably, camera 401 is installed at an angle facing slightly downward from the vehicle's horizontal plane 301 as described in FIG. 3A, though other configurations are also possible. In other words, in some embodiments, camera 401 may point downwards at an angle of 2 to 10 degrees. Optionally, the camera 401 may have a telephoto lens or a normal lens. For optimal performance, the camera 401 should have a field of view of 30 degrees+/−20 degrees, which will allow the display 403 to show at least a 10 ft.×8 ft. section of the garage wall just as the vehicle entered the garage. As the vehicle approaches its parking position, the section of the garage wall visible on the display 403 decreases. Ideally, the camera's focus is 5-10 feet in distance.

In such embodiments, a stationary reference point for determining a vehicle's precise position relative to the final parking position and also for determining the approach path defined by the GuidePath to the distinct target may be mounted to the back wall of a garage or parking space. In such embodiments, an LED 404 may be used, though it could be any object identifiable by shape, size, color or brightness that could be identified with available technology today like OCR. (Preferably, LEDs having brightness of 30-100 Lumens are used, which will be recognizable to processor 402 via video camera 401.) The LED 404 is brighter than any other item in the garage and therefore processor 402 can be adapted and configured to recognize the LED 404 in the video feed. Moreover, in such an embodiment, the processor 402 may execute software causing a virtual GuidePath 405 to be overlaid on the video display 403. Virtual GuidePath 405 may take the same shape as shown in FIG. 2. Moreover, in such embodiments, a driver maneuvers a vehicle in a manner that keeps virtual GuidePath 405, and in particular the vertical component 406 of virtual GuidePath 405, overlaid on the LED 404 to arrive at the precise parking position.

Figure 5A:
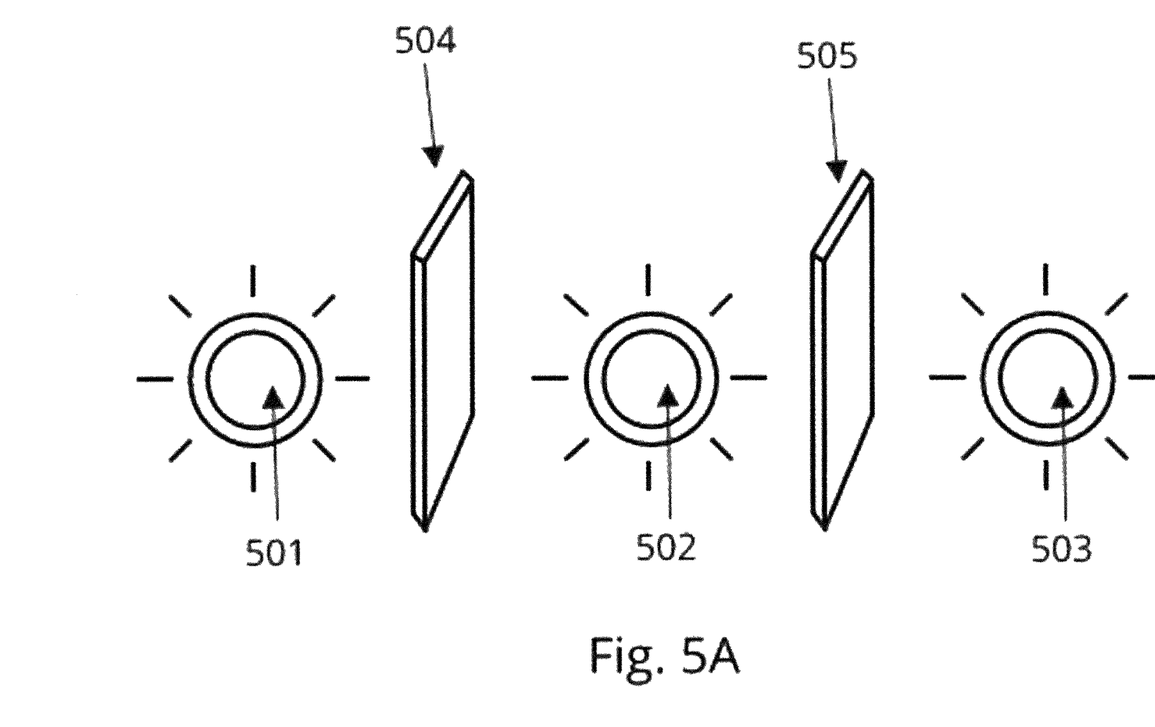
FIG. 5A is an exemplary view of an LED target having three LEDs each separated by a barrier.
Figure 5B:
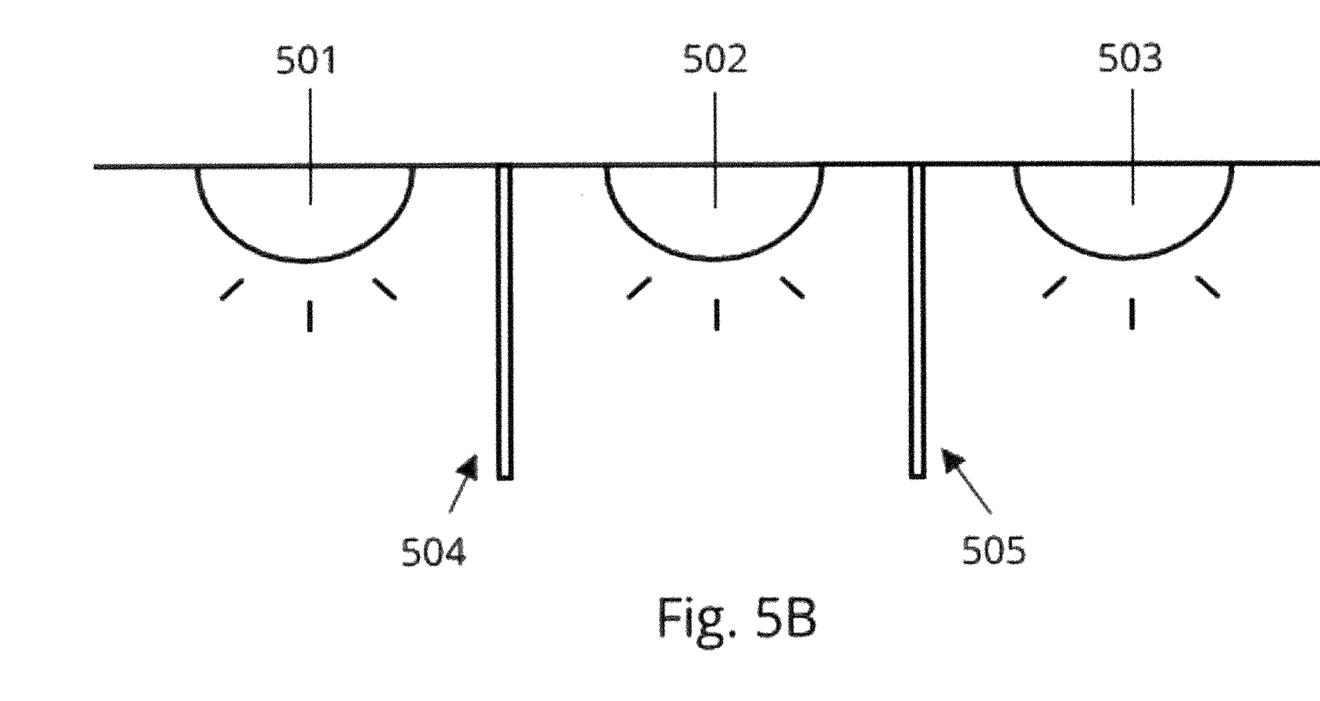
FIG. 5B is an exemplary top-down view of an LED target having three LEDs each separated by a barrier.

Optionally, as seen in FIGS. 5A and 5B, the LED 404 may comprise three LED lights—a left LED 501 being red, a center LED 502 being clear, and a right LED 503 that is green—positioned horizontal to each other and each LED being separated by panels 504 and 505 that preclude the simultaneous viewing of the left LED 501 and the right LED 503 from any angle other than straight-on. FIG. 5A shows such a LED 404 from a straight-on view, and FIG. 5B shows a top-down view of the same. As a result, a viewer viewing this embodiment of LED 404 from the left will see only left LED 501, in red. A viewer viewing from the right will see only right LED 503 in green. Viewing from straight-on allows all three LEDs to be visible. Preferably, to create this effect, the left and right (i.e. red and green) LEDs should have wide angles of diffusion while the center LED should have a very limited angle of diffusion, or use a laser diode. LED 404 may be actuated, i.e. illuminated, by a motion detector which detects a vehicle approaching. Other actuation methods include light, sonic, remote control, or via connection to a garage door opener. For typical garage settings, LEDs should be range from 30 to 100 lumens.

In embodiments according to FIG. 4, the video display 403 displays the camera feed, with a virtual GuidePath 405 overlaid over the video feed. The video feed and virtual GuidePath 405 may be driven by processor 402 executing software. As the vehicle approaches a parking spot, the video display 403 shows the camera feed of a garage's back wall, including the LED 404 mounted to the back wall. Once again, a driver approaches the parking position by viewing the video display 403 and lining up the LED 404 with the translucently superimposed virtual GuidePath 405, and preferably along the center stripe 406. Drivers use the visual feedback on video display 403 to steer the vehicle in a manner which corresponds to lining the LED 404 up with the virtual GuidePath 406. In some embodiments, processor 402 may suppress all video from the camera, showing only the LED 404 and the virtual GuidePath on the display 403. In other embodiments, the full camera feed remains visible with a virtual GuidePath overlaid.

In embodiments using the LED 404 of FIGS. 5A and 5B, a driver can further determine the vehicle's relative position based on the color of the LED displayed on the video display 403: if the red LED is visible, the vehicle is located left relative to the GuidePath and the green LED is blocks from view. This feedback indicates the driver should turn right. Similarly, when the vehicle is approaching from the center, the clear LED is visible, but the red and green LEDs are not visible. This indicates that the vehicle should continue its current approach until the clear LED is centered on the virtual GuidePath. If the green LED is visible on the screen, that is an indication that the vehicle is too far right, and an adjustment to the left should be made.

In some embodiments of the inventions, processor 402 may be connected to electro-mechanical technology in present use today that initiates software instructions to activate vehicle steering and acceleration controls, such as Lane Keep Assist System (LKAS) 408 to provide automatic parking functionality. LKAS is currently used to continually evaluate a vehicle's position—for example, during highway driving, LKAS may continuously monitor the vehicle's position relative to highway lane markers. LKAS uses a continuous feedback loop to ensure that the vehicle is not drifting too close to the lane makers, and if the vehicle does get too close, LKAS applies a torque to the steering wheel which adjusts the vehicle's position back into the lane. It is contemplated that technologies similar to LKAS—such as Lane Center Control (LCC)—may also be used.

In embodiments of the inventions disclosed herein, processor 402 may simply change or supplement the function of the LKAS system from moving away from a highway lane marker to moving towards the defined Guidepath-Target in a manner that keeps the vehicle moving along the virtual GuidePath 406 towards the Target 407. In such embodiments, processor 402 determines a vehicle's current position by calculating the position of the LED 404 relative to the virtual GuidePath 406 and Target 407. Processor 402 may be configured to distinguish the LED 404 in the camera feed based upon its brightness or any distinguishable characteristic. LED 404's position is then shown on a relative basis to the virtual GuidePath 406 and Target 407. A person having the benefit of this disclosure would understand that processor 402 may calculate the LED 404's position relative to the virtual GuidePath even without displaying it on the display. Thus, video display 403 is not a necessary element to processor 402's calculation, and display 403 can be used to display any other information—such as temperature, radio, etc.—while processor 402 calculates the relative position of the vehicle to the GuidePath based on the position of LED 404. In particular, processor 402 may be adapted and configured to calculate the distance between the LED 404 on the camera feed and the center of the virtual GuidePath 406. The horizontal distance between the LED 404 and GuidePath 406 represents the vehicles approach path, while the vertical distance to target 407 represents the vehicle's distance from the target, i.e. the distance from the back wall.

Using this calculation, processor 402 feeds a signal to the vehicle's LKAS system 408, providing a torque (either left or right) to correct the vehicle's path. This signal, which may be referred to as a corrective torque signal, represents the torque required to steer a vehicle along a virtual GuidePath 406. Processor 402 is calibrated to provide a steering torque (i.e. corrective toque signal) that causes a vehicle to follow virtual GuidePath 406. By way of example, if the vehicle is to the left of the center stripe 406, the torque applied may cause a steering correction to the right, and vice versa. This feedback loop is continually performed. Once the processor 402 detects that the LED 404 is following the center line of the virtual GuidePath, it signals to the LKAS to maintain a straight line until the LED 404 reaches the Target 407 of the virtual GuidePath. As the LED 404 approaches Target 407, processor 402 may also signal for the vehicle to reduce its speed, such that it comes to a complete stop precisely when target 407 is reached. The LKAS keeps the LED 404 "locked on," i.e. superimposed on the virtual GuidePath's center line. Moreover, speed should be decreased as the LED 404 approaches the Target 407. The same operation can be performed in reverse to guide the vehicle out of the garage.

The above description is not intended to limit the meaning of the words used in or the scope of the following claims that define the invention. Rather the descriptions and illustrations have been provided to aid in understanding the various embodiments. It is contemplated that future modifications in structure, function or result will exist that are not substantial changes and that all such insubstantial changes in what is claims are intended to covered by the claims. Thus, while preferred embodiments of the present inventions have been illustrated and described, one of skill in the art will understand that numerous changes and modifications can be made without departing from the claimed invention. In addition, although the term "claimed invention" or "present invention" is sometimes used herein in the singular, it will be understood that there are a plurality of inventions as described and claimed.

I claim:

1. A system for guiding a vehicle along a defined guide path, comprising:
   a garage-mounted LED indicative of a predetermined parking position; and
   a vehicle-installed, forward-facing video camera connected to a processor;
   wherein said processor is adapted and configured to display a video feed from said video camera on a display in the vehicle, and to overlay a virtual guide path over said video feed;
   the virtual guide path further comprising at least a path portion and a target portion;
   wherein the path portion of the virtual guide path further comprises a left and right border for alignment with the garage-mounted LED to arrive at the predetermined parking position; and
   wherein the target portion of the virtual guide path is configured to correspond to the vehicle being in the predetermined parking position when the garage-mounted LED overlaps with the target portion of the virtual guide path on the display in the vehicle.

2. The system of claim 1, wherein said virtual guide path further comprises a center vertical translucent component with left and right, contiguous translucent borders and the target portion is appended at one end of the virtual guide path.

3. The system of claim 2, wherein said video camera is aimed directly ahead of said vehicle and 2 to 10 degrees away from the horizontal plane.

4. The system of claim 1, wherein the processor is further adapted and configured to identify the garage-mounted LED's position on the display, and to calculate the vehicle's relative position by determining the distance between the LED's position, and the virtual guide path; and wherein the processor is further adapted and configured to send a signal indicative of a corrective steering torque to the vehicle's steering system; the corrective steering torque causing the LED and the virtual guide path to align.

5. The system of claim 4, wherein the processor further sends a signal to an LKAS system in the vehicle indicative of a reduced speed as the LED approaches the target portion, and wherein the processor further sends a signal to the vehicle's LKAS system indicating the vehicle to stop when the LED is aligned with the target portion.

6. A method for parking a vehicle at a predetermined parking position, comprising the steps of:
   mounting an LED indicative of a predetermined parking position on a wall of a garage;
   activating a forward-facing video camera installed in a vehicle; wherein the video camera is in operable communication with a processor and a display;
   displaying a video feed from the video camera on the display;
   using the processor to overlay, on the display, a virtual guide path over said video feed, the virtual guide path comprising at least a path portion and a target portion; and
   driving said vehicle to maintain an alignment between the LED and the path portion of the virtual guide path on the display; and
   observing the display and parking the vehicle in the predetermined parking position once the LED aligns with the target portion of the virtual guide path on the display.

7. The method of claim 6 for parking a vehicle at a predetermined parking position, wherein the step of driving said vehicle to maintain an alignment between the LED and the path portion of the virtual guide path on the display further comprises the steps of:
   using the processor to calculate the distance between the LED on the video feed and a center portion of the virtual guide path;
   sending a corrective torque signal from the processor to an LKAS system; and
   using the LKAS system to steer the vehicle based on the corrective torque signal.

* * * * *